Jan. 1, 1935.  W. A. GARRATT  1,986,572
VARIABLE SPEED POWER TRANSMISSION DEVICE
Original Filed May 2, 1925   3 Sheets-Sheet 1
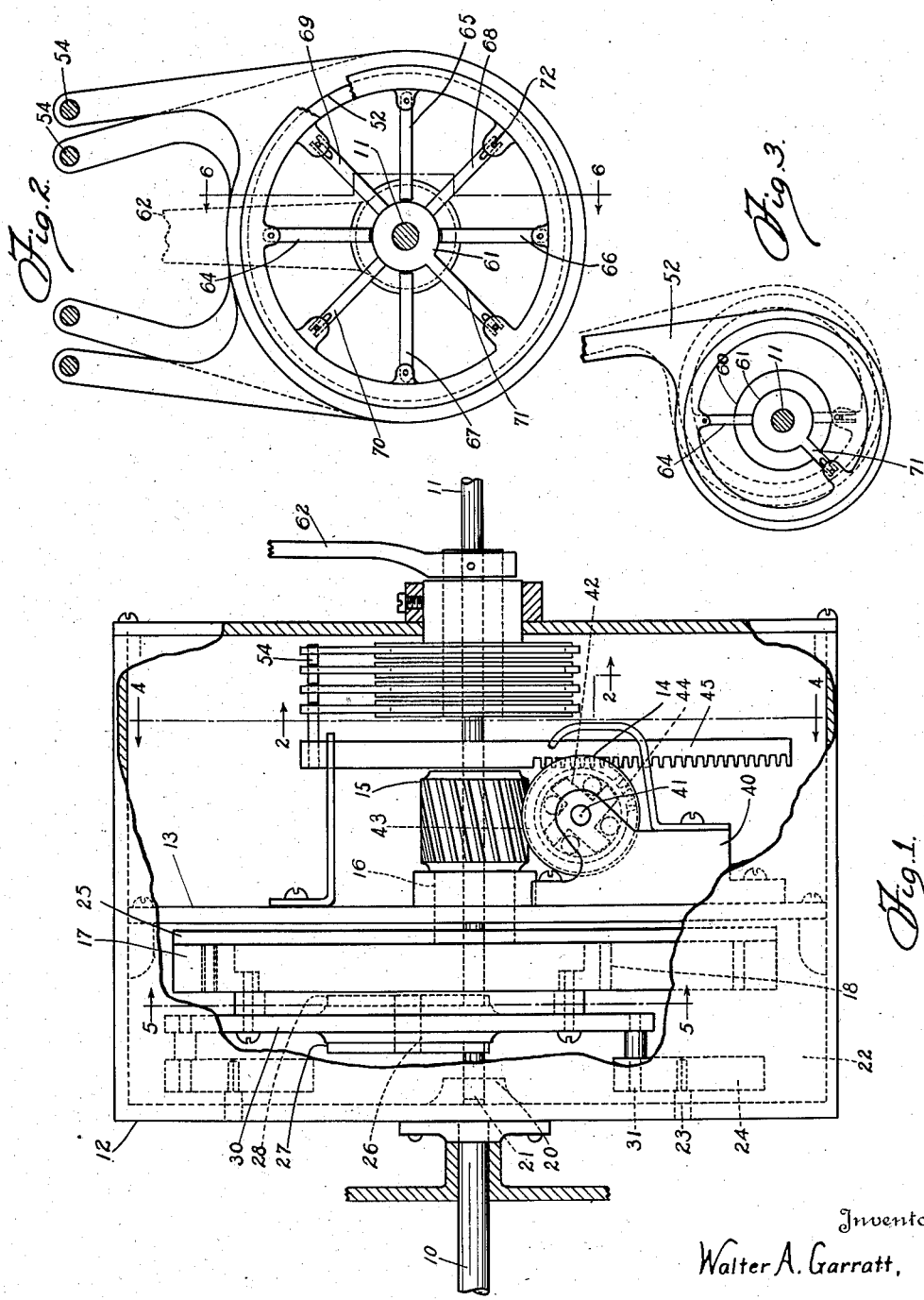

Jan. 1, 1935.  W. A. GARRATT  1,986,572

VARIABLE SPEED POWER TRANSMISSION DEVICE

Original Filed May 2, 1925   3 Sheets-Sheet 2

Inventor
Walter A. Garratt,
By Murray and Gugelter
Attorneys.

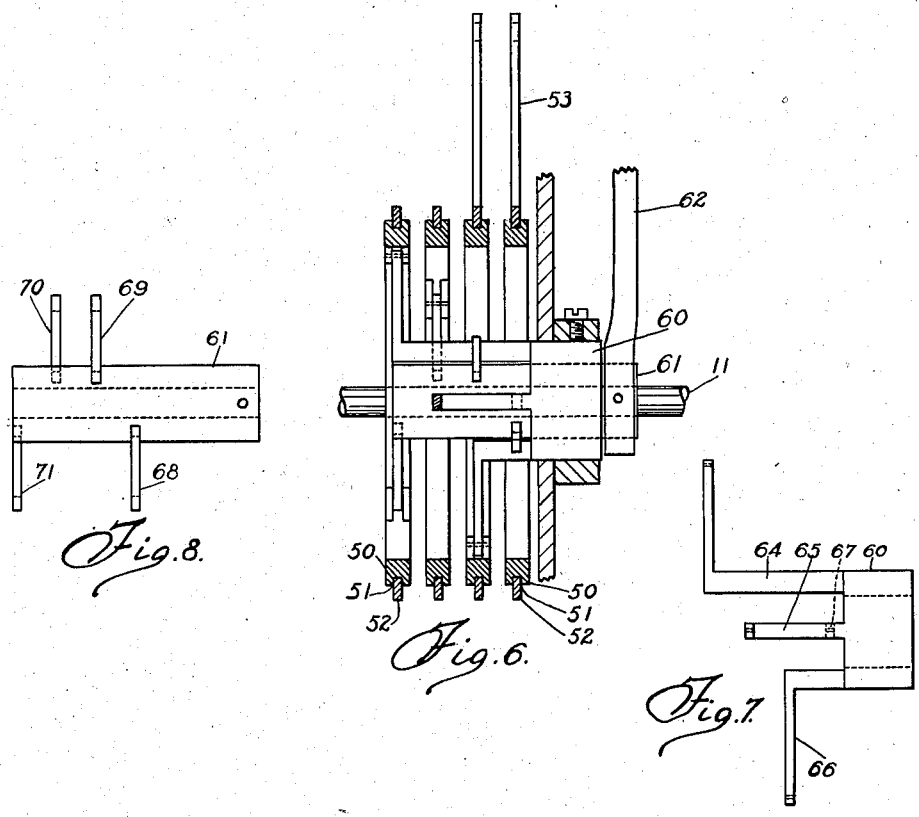

Patented Jan. 1, 1935

1,986,572

UNITED STATES PATENT OFFICE 1,986,572

VARIABLE SPEED POWER TRANSMISSION DEVICE

Walter A. Garratt, Covington, Ky.

Application May 2, 1925, Serial No. 27,602
Renewed May 31, 1934

16 Claims. (Cl. 74—283)

An object of my invention is to provide a device for transmission of power that is capable of effecting variation in speed between the drive and driven parts thereof, and which device is particularly adaptable to motor vehicles and the like.

Another object of my invention is to provide a device for the purpose stated that may be applied to a motor vehicle for obviating the transmission system generally used with the present type of motor vehicles whereby to obviate the shifting of gears and the like.

Another object of my invention is to provide a device for the purposes stated wherein the drive and driven members are always in engagement, or in other words may be said to be in gear at all times although the device is capable of having its parts so related that there is no actual transmission of power from the drive to the driven parts thereof.

Another object of my invention is to provide a device for the purposes stated that permits its parts to be so manipulated that the direction of movement of the driven member may be reversed in relation to the drive member thereof without the interpositioning of any other agency or means than those utilized in the transmission of power from the drive to the driven parts thereof in a forward or given direction.

Although in the accompanying drawings and description there is shown but one form of device for attaining the aforementioned objects, it will be readily evident from an understanding of the said device that the various sub-combinations of the structure may be modified, varied and replaced by other mechanisms and sub-combinations without departing from the broad scope of the invention disclosed herein. This statement is made because of the fact that for many years there has been great effort expended toward the attainment of a device that will perform the function of the device disclosed herein, namely the provision of a positive, multi-variable, simple and efficient power transmission device especially adaptable to motor vehicles and wherein the drive or crank shaft and driven shaft or propeller shaft, of a motor vehicle are at all times in gear even while a change in speed is being accomplished.

These and other objects are attained by the means described herein and disclosed in the accompanying drawings, in which:

Fig. 1 is a side elevation, parts shown in section, and parts being broken away, showing a device embodying my invention.

Fig. 2 is an enlarged sectional view on line 2—2 of Fig. 1.

Fig. 3 is a fragmental detail view of an eccentric cam forming a detail of my invention.

Figure 4:
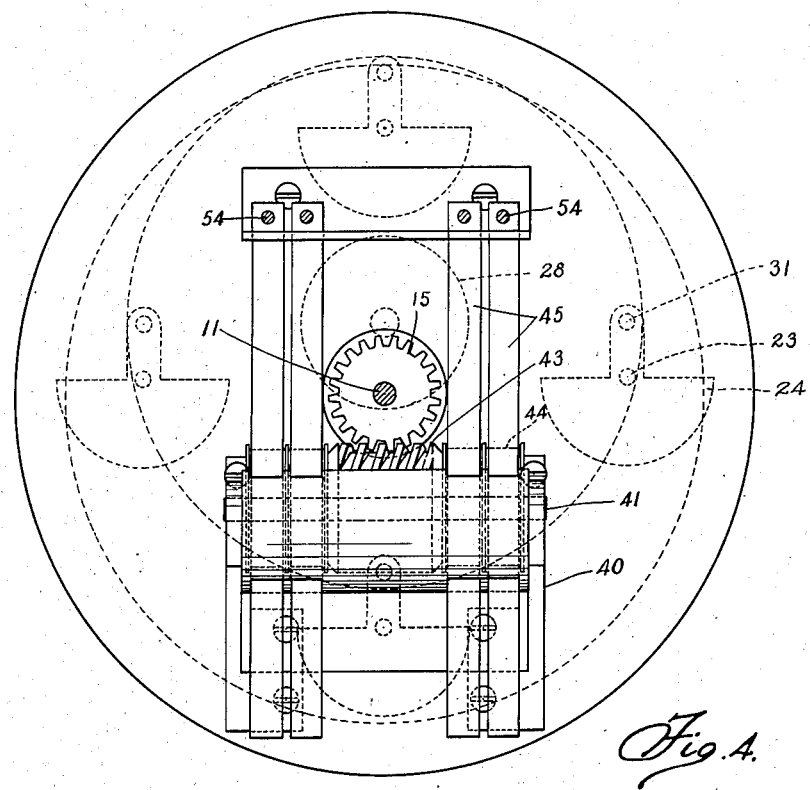
Figure 5:
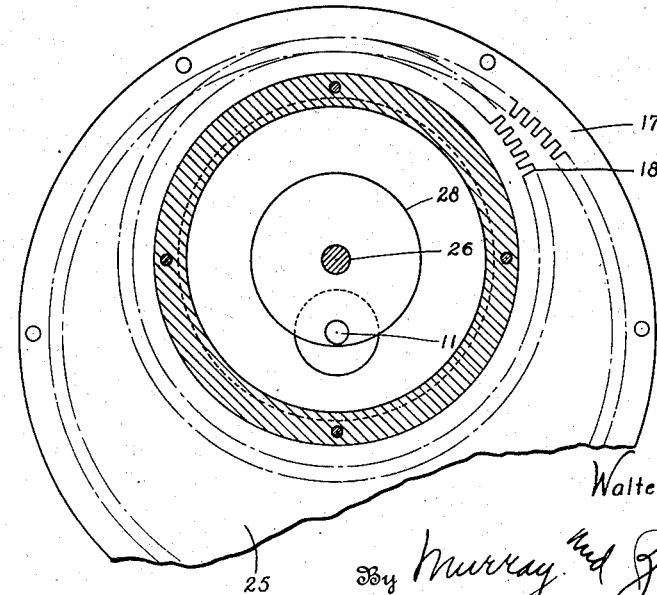

Fig. 4 is a sectional view on line 4—4 of Fig. 1.
Fig. 5 is a sectional view on line 5—5 of Fig. 1.
Fig. 6 is a sectional view on line 6—6 of Fig. 2.
Figs. 7 and 8 are detail views of sleeve bearings forming details of my invention.

Before explaining the details of the device it is desired to generally point out the operation of the device and the manner in which the several parts thereof co-operate.

The shaft 10 may be considered the crank or drive shaft and the shaft 11 the driven or propeller shaft of an automobile. The crank shaft and the driven shaft are aligned and the driven shaft may have a bearing in the end of the crank shaft 10 whereby to permit independent rotation of said shafts. Motion is transmitted from the crank shaft 10 to the housing 12 that performs the function of a fly-wheel. The fly-wheel housing 12 may be extended, as shown herein, to form a cover or housing for all of the parts of the mechanism. The fly-wheel housing comprises a plate-like member 13 carrying a device 14 in the nature of a locking means whereby to lock the worm wheel 15 so that said worm wheel will revolve with the plate 13 and fly-wheel. The worm wheel 15 is revolubly mounted upon the driven shaft 11 and is connected by means of a sleeve 16 extending through plate 13, with an internal gear 17. The internal gear 17 is engaged by a spur gear 18 of a lesser diameter than the internal gear 17. The spur gear is mounted eccentrically on the driven shaft 11 but is so connected that it revolves with the driven shaft. From the foregoing it will be evident that if the worm wheel 15 is held against rotation relative to the fly-wheel, the crank shaft and driven shaft will rotate at the same speed, and that if the worm wheel 15 may slip or in other words be caused to revolve at a different rate of speed from that at which the fly-wheel revolves, there will be a corresponding variation in speeds between the crank shaft and the driven shaft. The means for effecting this variation in relative rotation of the fly-wheel and the worm wheel 15 will be explained in detail hereafter.

The crank shaft 10 is fixedly secured to the fly-wheel 12 by any suitable means. As disclosed herein the fly-wheel is provided with an internal bearing 20 for the reception of the forward end 21 of the driven shaft 11. Within the chamber 22 provided within the fly-wheel are disposed pins or bearings 23 upon which are rotatably mounted weight compensating blocks 24. The plate 13, forming a closure for the chamber 22 is provided with a central aperture revolubly receiving the sleeve 16 fixedly attached to the worm wheel 15. Within the chamber 22 the sleeve 16 carries a plate 25 and to the plate 25 is attached an internal gear 17. Interiorly of the internal gear 17 is disposed a pinion or spur gear 18. The spur gear 18 is disposed eccentrically to the shafts 10 and 11 whereby only a portion of the teeth of the spur gear engage a portion of the teeth of the internal gear. The axis of the spur gear is formed by the bearing 26 carried by and connecting the spaced discs 27 and 28. The discs 27 and 28 have eccentric mountings upon the shaft 11. It is to be noted that the shaft 11 is broken and that in fact the discs 27 and 28, the bearing 26, and the ends 21 and 11 together constitute or comprise the driven shaft. A disc 30 is revolubly received between the discs 27 and 28 and carries the pinion or spur gear 18. From the foregoing it will be evident that the discs 27, 28 and 30 and the spur gear 18, in that they are eccentrically disposed in relation to the axis 10—11 will, at all times, be out of balance unless compensating balancing means are provided. The weights 24 constitute such compensating balancing means. Each of the weights 24 has a pivotal connection upon a stud or pin 31 extending from the disc 30 whereby upon rotation of the disc 30 the compensating weights 24 are rotated upon their mountings 23, the heavier portions of the weights 24 being projected outwardly or away from the axis 10—11 when the bulk of the weight of the discs and the spur gear 18 are disposed on the opposite side of the axis 10—11. This will be readily evident from a reference to Fig. 4.

Exteriorly of the chamber 22, the plate 13 carries brackets 40 revolubly supporting a shaft 41. In the present embodiment of my invention there are mounted upon the shaft 41, four over-running clutches 42. The clutches are adapted to move the shaft 41 in but one direction. The shaft 41 has fixedly secured to it a worm 43 meshing with the worm wheel 15. Each over-running clutch comprises an associated gear 44 and for each gear 44 there is provided a co-operating rack 45. The racks are reciprocally mounted. From the foregoing it will be evident that should the racks be reciprocated, motion will be transmitted to the shaft 41 and from the shaft 41 to worm 43 and worm wheel 15. From the worm wheel 15 motion is transmitted to the internal gear 17 and from the internal gear 17 to the spur gear 18 whereby to cause the spur gear to revolve about the axis 10—11 thereby carrying the axis 26 of the spur gear about the axis 10—11 and thereby causing the driven shaft 11 to rotate. It therefore follows that should the crank shaft 10 be revolved and the racks 45 be reciprocated to such extent that the shaft 41 is revolved because of the action of the racks, to such extent that the rotation of the worm and the racks about the axis 10—11 compensates for the rotation of the shaft 10 so that in fact the worm wheel 15 remains stationary (except for the amount of movement necessary to compensate for the difference in the number of teeth on the gears 17 and 18), then there will be no transmission of power through the worm wheel 15, the internal gear 17 and the ring gear 18 to the shaft 11. By variating the relative movements of the racks, their associated pinions, the shaft 41 and the fly wheel, it is possible to attain transmission of power from the crankshaft 10 to the driven shaft 11 from a zero transmission to a maximum transmission, zero transmission meaning that there is such compensation, between the parts that the worm wheel 15 remains stationary, except as above stated, at which time the device might be said to be in a neutral position and the maximum meaning when the worm wheel 15 is so locked that it revolves in unison with the shaft 10 thereby giving a one to one transmission from the crank shaft 10 to the driven shaft 11.

Variations in compensation are effective by modifying or variating the stroke of the racks. It will be evident that whereas the racks are carried by brackets mounted upon the plate 13, the racks will revolve with the crank shaft. If the racks reciprocate a given distance per revolution for the crank shaft, they will rotate the shaft 41 a given number of times. If the stroke of the racks is varied per one rotation of the crank shaft, an equivalent variation in the speed of rotation of the shaft 41 will result. Consequently, there will be a variation in the rate at which the worm wheel 15 is revolved. From the foregoing it will be evident that if the racks are reciprocated and their strokes are made sufficiently long, it is possible to effect a reverse motion of the worm wheel that will be transmitted to the driven shaft 11. Any suitable compensating means other than that disclosed herein may be employed in lieu of the racks. The means disclosed herein for controlling the stroke of the racks may be modified without departing from the scope of the instant exemplification of my invention. The means for modifying the stroke of the racks is identical for each of the racks wherefore an explanation of one will suffice for all. For each rack there is provided a ring bearing 50 having an annular groove 51 in which is revolubly received a ring like member 52 provided with an arm 53. The outer end of the arm is provided with a bearing that receives a pin 54 extending from one end of its associated rack. From the foregoing it will be evident that if the ring bearing 50 is disposed concentrically to the shaft 11 then the member 52 will revolve in the annular groove 51 and while so revolving will retain the pin 54 of its associated rack, in a path concentric to the shaft 11, and that if the ring bearing 50 be moved to a position such that it will be eccentric to the shaft 11, then the ring-like member 52 in that it must revolve about the shaft 11, will cause reciprocation of its associated rack. The extent to which the rack is reciprocated, or in other words the stroke of the rack, will be controlled by the extent to which the ring-like member 52 is moved between its limits, said limits being concentricity and maximum eccentricity in relation to the shaft 11. The plurality of racks serves to increase the ease of operation of the device while the change in length of stroke of the racks will control the transmission of power between shafts 10 and 11.

The means for moving the bearing rings to and from concentric relation to the shaft 11 comprises a pair of sleeves 60 and 61. The sleeve 60 is fixed, and may be attached to the vehicle frame or any other suitable fixed structure. The sleeve 61 is adapted to be oscillated within the sleeve 60 by any suitable means for example, a lever 62. Each ring bearing has a pivotal mounting upon each of the sleeves 60 and 61. The pivotal connection between each ring bearing and the fixed sleeve 60 must necessarily stay in the same position, however when the pivotal bearings of the ring bearings upon the oscillating sleeve 61 are moved because of the movement of the sleeve 61 in relation to the sleeve 60, the ring bearings necessarily are moved to eccentric positions. The sleeves are provided with suitable arms 64, 65, 66, 67, 68, 69, 70 and 71 for providing the necessary pivotal connections between the sleeves and the ring bearings. The arms 68 to 71 inclusive, carried by the oscillating sleeve 60, are provided with elongated slots in which the pins or pivots 72 carried by the ring bearings may reciprocate in order to compensate for the movement of the ring bearings laterally in relation to the shaft 11 and sleeves 60 and 61. In Fig. 3 a ring bearing, together with its associated ring-like member 52, is shown in eccentric and concentric positions in relation to the shaft 11. The eccentric position is shown in dotted lines.

The operation of my device is as follows:

Assuming that the device disclosed herein is applied to an automobile, the crank shaft 10 would be revolving as a result of the action of the cylinders. In order to place the transmission device in neutral the operator would actuate the lever 62 to such position that the racks would be reciprocated to such extent that the worm 43 would revolve with its shaft 41, a sufficient number of times per revolution of the fly-wheel 12 and shaft 10 that the worm would be carried around the worm wheel 15 by the plate 13 without imparting any motion to the worm wheel 15 except where it might be necessary to compensate for the difference in number of teeth upon the spur gear and the internal gear. In other words, there would be only such movement of the worm wheel 15 as would attain a stationary status of the driven shaft 11 in relation to drive shaft 10. Should the operator then desire to move the vehicle forward or reverse the vehicle he would actuate the lever 62 in the proper direction so as to either increase the strokes of the racks to effect a reverse or decrease the strokes of the racks for effecting a forward motion. As the ring bearings would be moved from their neutral eccentric positions, toward their concentric positions in relation to the shaft 11, assuming the vehicle is to be moved forwardly, the stroke of the racks would be shortened, consequently the worm would not make as many revolutions per revolution of the fly-wheel 12 and there would be transmission of power to the worm wheel 15 in proportion to the failure of the racks to turn the worm the number of revolutions necessary to retain the crank shaft and driven shaft in neutral positions. The rotation of the worm-wheel 15 would be transmitted to the internal gear 17 and from thence to the pinion or spur gear to the shaft 11 as previously explained. As the lever 62 would be moved further and further for bringing the ring bearings closer to their concentric positions, the racks would have their strokes shortened with a consequent increase in rotation of the worm wheel 15 until at the time when the ring bearings were brought to positions concentric with the driven shaft 11, the worm wheel would move revolution for revolution with the fly-wheel at which time there would be direct transmission from crank shaft 10 to driven shaft 11.

The foregoing explanation of the transmission of motion assumes that the worm wheel 15 is revolved by the worm 43. However, it would seem that the probabilities are that the worm wheel 15 revolves the worm 43 and that as the shaft 41 permits rotation of the worm 43, the eccentric connection comprising the disc 30 and the spur gear 18 modifies transmission of rotatory power from the drive shaft to the driven shaft through the agency of the crank structure comprising the eccentric bearing 26, the discs 27, 28 and 30. From this viewpoint the operation of the device is as follows: The eccentric bearing 26, or axis 26, functions as a crank, forming part of the driven shaft 11. As the disc 30 revolves with the fly-wheel 12, the disc 30 will either revolve freely upon the axis 26 without imparting rotary motion through such crank structure to shaft 11, or else, should the disc 30 be withheld against free rotation upon the axis 26, the driven shaft 11 is revolved through the agency of said crank structure. Accordingly, the various racks 45, worm wheel 15, worm and clutches mounted on shaft 41, and other elements contained within the chamber containing the said elements, together with the internal gear 17, function purely as an escapement device, the degree of escapement controlling the degree of relative movement between the drive and driven shafts. From the foregoing it will be evident that the rotation of the worm wheel 15 does not control transmission of power between shafts 10 and 11, but, rather, it is revolved as an element in a running down system or escapement device, wherefore a direct one to one drive between shafts 10 and 11 may be attained.

What I claim is:

1. In a device of the class described the combination of a revolving plate, a shaft revolubly carried by the plate, the axis of the shaft extending in parallelism with the plane of rotation of the shaft, a worm fixed to the shaft, gears carried by the shaft, means arranged to permit free movement of the gears in one direction and to lock the gears for movement with the shaft in the opposite direction, a reciprocating rack for each gear arranged for movement with the plate, means for controlling reciprocation of the racks, a driven shaft, a worm wheel revolubly mounted on the driven shaft and engaging the worm, and means for transmitting motion from the worm wheel to the driven shaft.

2. In a device of the class described the combination of a driven shaft, a plate, a worm revolubly carried by the shaft and having its axis disposed in parallelism with the plane of rotation of the plate, gears connected with the worm and arranged for movement in a given direction with the worm and for free movement in the opposite direction, a rack for each gear mounted for reciprocation, an arm connected to each rack, means for moving the arms to and from positions for effecting variable reciprocation of the racks a driven shaft, a worm wheel revolubly mounted on the driven shaft and engaging the worm, and means for transmitting power from the worm wheel to the driven shaft.

3. In a device of the class described the combination of aligned drive and driven shafts, a worm wheel revolubly mounted on the driven shaft, a plate carried by the drive shaft, a worm carried by the plate and having its axis disposed in a plane extending in parallelism with the plane of rotation of the plate, the worm and the worm wheel meshing, gear wheels arranged to move with the worm in a given direction and for independent movement in the opposite direction, a rack for each gear, arms having revoluble bearings adapted to be moved to positions concentric with the driven shaft and eccentric to the driven shaft, connections between one each of the racks and one each of the arms, means for moving the revoluble bearings for the arms to and from concentric positions in relation to the driven shaft, the racks and arms adapted to revolve with the plate, and means for transmitting motion from the worm wheel to the driven shaft.

4. In a device of the class described, the combination of a revoluble drive member, a revoluble driven member, an eccentric member connected to the drive member for precluding independent rotation of the drive and eccentric member, an eccentric bearing on the driven member revolubly mounting the eccentric member, and an escapement device for variably controlling relative movement of the eccentric member and the eccentric bearing on the driven shaft.

5. In a device of the class described, the combination of a drive shaft, a driven shaft, a connection between the drive and driven shafts having a bearing upon the driven shaft rotative relative to the driven shaft, said connection moving with the drive shaft and having a limited non-rotatory motion relative to the drive shaft, and means controlling transmission of rotatory motion from the drive shaft and connection to the driven shaft.

6. In a device of the class described, the combination of a rotating housing, a partition within the housing for dividing the interior of the housing into a pair of compartments, a driven shaft co-axial with the housing and extending into both chambers within the housing, a connection within one of the chambers, between the housing and the driven shaft, said connection arranged for rotatory movement with the housing and having a revoluble bearing upon the driven shaft and means disposed within the second chamber for controlling rotative movement of the connection in the first mentioned chamber relative to the driven shaft and comprising a part projecting into the first chamber for cooperation with the said connection.

7. In a device of the class described, the combination of a rotating drive shaft, a revolubly mounted driven shaft, a connection between the drive and driven shafts, said connection having its center of rotation concentric to and spaced from the axis of the drive shaft and mounted for non-rotative motion about the axis of the drive shaft, except in conjunction with movement of the drive shaft about said axis, and means for controlling transmission of motion from the connection to the driven shaft.

8. A variable speed device embodying a driving element, a driven element, a connection having mountings on both the driving and driven members, whereby said connection is revolved with the driving member and may rotate on its mounting on the driven member, and an adjustable escapement device operative from said driving element whereby the connection is controlled in its rotation on its mounting on the driven member.

9. In a device of the class described the combination of drive and driven members having a common axis, a crank formed on the driven member, a member mounted for rotation on and with the crank, a linked connection between the last mentioned member and the drive shaft, said linked connection having a bearing on both the drive member and the member on the crank about each of which bearings the linked connection may rotate, and means for modifying the rotating movement of the member on the crank, whereby the drive member may operate the driven member at variable relative speeds.

10. In a variable power transmission the combination of a drive shaft, a driven shaft coaxial with the drive shaft, a crank formed on the driven shaft, a member mounted on the crank adapted for rotation on and with the crank, links, each link having an end revolubly mounted on the drive shaft and each link having its second end revolubly mounted on the member on the crank, the throws of the links and the crank being equal, and means for adjustably controlling the rotation of the member on the crank.

11. In a device of the class described the combination of a rotatable drive member, a driven member coaxial with the drive member, a member eccentric to said drive and driven members, means connecting said eccentric member to said drive member and precluding independent rotation of the drive member and eccentric member about the axis of the drive member, the eccentric member, connecting means and drive member having limited relative movement for successively bringing all parts of the eccentric member to and from positions adjacent to and remote from the driven member, means connected with the driven member engaging the eccentric member whereby rotation of the eccentric member by the drive member causes the eccentric member to rotatably actuate the driven member, and means operative upon the eccentric member for modifying the relation of the eccentric member and the drive member for providing variable transmission of motion to the driven member.

12. In a device of the class described the combination of a rotating drive member, a driven member coaxial with the drive member, an eccentric member connected with the drive member for precluding independent rotatory movement of the drive member and eccentric member, the drive member and eccentric member having relative nonrotating eccentric movement whereby various portions of the eccentric member may describe circles concentric with the axis of the drive member, the driven member comprising a portion having driving engagement at all times with one of the portions of the eccentric member whereby the eccentric member, when rotating with the drive member may rotatably actuate the driven member, and means operable on the eccentric member for imparting variable gyratory movement to the eccentric member in relation to the drive member for effecting variable transmission of motion to the driven member.

13. In a device of the class described the combination of a rotating drive member, a member connected for rotary movement with the drive member and retained in eccentric position in relation to the axis of rotation of the drive member, said eccentric member having a controllable independent nonrotating eccentric movement relative to the drive member and the axis of the drive member, means for actuating and controlling the independent nonrotating movement of the eccentrically positioned member, and a driven member coaxial with the drive member and comprising a member in driving contact with the eccentrically positioned member whereby the eccentric throw of said eccentrically positioned member rotatably actuates the driven member.

14. In a device of the class described the combination of a rotatable drive member, a driven member coaxial with the drive member, a member eccentric to said drive and driven members, means connecting said eccentric member to the drive member for retaining the eccentric member in a constant degree of eccentricity relative to the drive member, said eccentric member having limited movement relative to the drive member and having a rate of rotation identical with the rate of rotation of the drive shaft, means operative on the driven member and responsive to the movement of the eccentric member for transmitting motion from the eccentric member to the driven member, and means operative upon the eccentric member for modifying the position of the eccentric member relative to the drive member for providing variable transmission of motion to the driven member.

15. In a device of the class described the combination of a drive member, a driven member coaxial with the drive member and comprising a crank, a connection revolubly mounted on and with the crank, having unitary rotation with the drive shaft and having limited eccentric movement relative to the drive shaft, and a control means operable on said connection for modifying the movement of said connection relative to said drive and driven members for effecting variable relative movement of said drive and driven members.

16. In a device of the class described, the combination of a drive member, a driven member, a connection between the drive and driven members for unitary rotation with the drive member, and having an independent eccentric nonrotating movement relative to said drive member for imparting movement to the driven member, and means for varying the independent movement of the connection for varying the relative movements of the drive and driven members.

WALTER A. GARRATT.